US006001482A

United States Patent [19]

Anderson et al.

[11] Patent Number: 6,001,482
[45] Date of Patent: *Dec. 14, 1999

[54] INK JET RECEPTOR ELEMENT HAVING A PROTECTIVE LAYER

[75] Inventors: Brian L. Anderson; Theresa M. Chagnon, both of Chicopee; Douglas Allan Cahill, Belchertown; Richard Scott Himmelwright, Willbraham, all of Mass.; Dene Harvey Taylor, New Hope, Pa.

[73] Assignee: Rexam Graphics, Inc., South Hadley, Mass.

[ * ] Notice: This patent is subject to a terminal disclaimer.

[21] Appl. No.: 08/906,223

[22] Filed: Aug. 4, 1997

Related U.S. Application Data

[63] Continuation-in-part of application No. 08/615,958, Mar. 14, 1996, Pat. No. 5,688,581, and application No. 08/115,561, Sep. 3, 1993, Pat. No. 5,795,425.

[51] Int. Cl.[6] .......... B32B 9/00

[52] U.S. Cl. .......... 428/409; 428/195; 428/421; 428/474.4; 428/500

[58] Field of Search .......... 428/40.1, 40.2, 428/41.5, 41.7, 41.8, 42.1, 195, 211, 220, 908.8, 913.3, 914, 409, 421, 474.4, 500; 156/230, 235, 240, 277

[56] References Cited

U.S. PATENT DOCUMENTS

| | | | |
|---|---|---|---|
| 3,043,732 | 7/1962 | Shepherd, Jr. | 156/230 |
| 3,376,182 | 4/1968 | Borell et al. | 156/235 |
| 3,519,456 | 7/1970 | Reed et al. | 156/240 |
| 3,554,835 | 1/1971 | Morgan | 156/234 |
| 3,607,526 | 9/1971 | Biegen | 156/235 |
| 4,027,345 | 6/1977 | Fujisawa et al. | 156/240 |
| 4,165,399 | 8/1979 | Germonprez | 427/264 |
| 4,171,398 | 10/1979 | Hunt | 428/195 |
| 4,235,657 | 11/1980 | Greenman et al. | 156/234 |
| 4,318,953 | 3/1982 | Smith et al. | 400/200 |
| 4,515,849 | 5/1985 | Keind et al. | 428/201 |
| 4,555,436 | 11/1985 | Geurtsen et al. | 428/200 |
| 4,556,589 | 12/1985 | Neumann et al. | 428/35 |
| 4,666,757 | 5/1987 | Helinski | 428/203 |
| 4,686,260 | 8/1987 | Lindemann et al. | 524/458 |
| 4,721,635 | 1/1988 | Helinski | 428/15 |
| 4,732,786 | 3/1988 | Patterson et al. | 427/261 |
| 4,775,594 | 10/1988 | Desjarlais | 428/421 |
| 4,780,348 | 10/1988 | Yamamato et al. | 428/43 |
| 4,900,597 | 2/1990 | Kurtin | 428/41 |
| 4,927,709 | 5/1990 | Parker et al. | 428/352 |
| 4,983,436 | 1/1991 | Bailey et al. | 428/40 |
| 4,983,487 | 1/1991 | Gilreath | 430/126 |
| 5,006,502 | 4/1991 | Fujimura et al. | 428/175 |
| 5,120,383 | 6/1992 | Takei et al. | 156/240 |
| 5,126,195 | 6/1992 | Light et al. | 428/327 |
| 5,160,778 | 11/1992 | Hashimoto et al. | 428/195 |

(List continued on next page.)

FOREIGN PATENT DOCUMENTS

| | | | |
|---|---|---|---|
| 0546650 | 6/1993 | European Pat. Off. . | |
| 3616081 | 11/1987 | Germany . | |
| 3717107 | 11/1987 | Germany . | |
| 52-26915 | 7/1977 | Japan | 156/241 |
| 54-116406 | 9/1979 | Japan | 156/277 |
| 57-87397 | 5/1982 | Japan | 156/239 |
| 2210828 | 6/1989 | United Kingdom | 156/239 |

OTHER PUBLICATIONS

W.E. Haas, Non–Impact Printing Technologies, in *Imaging Processes and Materials,* pp. 379–384, Van Norstand, New York, 1984.

Kynar® SL Technical Data, Elf Atochem, King of Pressure, PA, Mar. 1993.

*Primary Examiner*—Bruce H. Hess
*Assistant Examiner*—Michael E. Grendzynski
*Attorney, Agent, or Firm*—Ratner & Prestia

[57] ABSTRACT

An ink jet image receptor element having a protective coating is disclosed. The protective coating is a single protective layer that contains a fluoropolymer and an acrylic polymer. Because the protective coating is resistant to surface pitting, dirt, stains, and general degradation, images formed from the element can be used effectively on billboards, banners, posters, and other outdoor signs.

20 Claims, 4 Drawing Sheets

U.S. PATENT DOCUMENTS

| | | | |
|---|---|---|---|
| 5,198,306 | 3/1993 | Kruse | 428/201 |
| 5,217,773 | 6/1993 | Yoshida | 428/40 |
| 5,217,793 | 6/1993 | Yamane et al. | 428/212 |
| 5,225,260 | 7/1993 | McNaul et al. | 428/40 |
| 5,266,431 | 11/1993 | Mammino et al. | 430/96 |
| 5,310,436 | 5/1994 | Pricone et al. | 156/209 |
| 5,316,608 | 5/1994 | Ocampo et al. | 156/230 |
| 5,400,126 | 3/1995 | Cahill et al. | 355/278 |
| 5,414,502 | 5/1995 | Cahill et al. | 355/278 |
| 5,483,321 | 1/1996 | Cahill et al. | 355/200 |
| 5,672,413 | 9/1997 | Taylor et al. | 428/195 |
| 5,795,425 | 8/1998 | Brault et al. | 156/235 |

INK JET RECEPTOR ELEMENT HAVING A PROTECTIVE LAYER

CROSS-REFERENCE TO RELATED APPLICATIONS

This application is a continuation-in-part of Ser. No. 08/615,958, filed Mar. 14, 1996, now U.S. Pat. No. 5,688,581, issued Nov. 18, 1997, and a continuation-in-part of Ser. No. 08/115,561, filed Sep. 3, 1993, now U.S. Pat. No. 5,795,425, issued Aug. 18, 1998.

FIELD OF THE INVENTION

This invention relates to ink jet printing processes for making images, and particularly, color images. In particular, this invention relates to an ink jet receptor element for the production of large size, full color images in which the image has a protective layer containing a fluoropolymer and an acrylic polymer.

BACKGROUND OF THE INVENTION

The use of ink jet printing in the production of images is well known. Ink jet printing and its use in making full color images is reviewed in W. E. Haas, "Non-Impact Printing Technologies," pp. 379–384, of *Imaging Processes and Materials—Neblette's Eighth Edition*, John Sturge, Vivian Walworth & Allan Shepp, eds., Van Nostrand Reinhold, New York, 1989. In these processes, ink droplets are emitted from a nozzle and deposited on a receptor to form an image. Although paper stock is extensively used as the receptor, many other materials are used, such as plastic film and sheet, fabric, metal, wood, and glass. When transparencies are produced, a coated transparent plastic film or sheet typically is used as the receptor.

Ink jet printing processes can produce high quality four-color images in sizes ranging from office copy up to sizes useful for posters, displays and billboards. However, ink jet printing has been limited largely to applications such as office copy in which environmental and/or abrasion damage to the image is unlikely.

In applications in which the image will be subject to handling or exposed to the elements, such as in posters, banners, displays, wall coverings, and particularly billboards, a protective layer is essential to protect the water-sensitive ink jet image and its underlying receptor from rain, sunlight, and other environmental contaminants as well as from abrasion and graffiti. It is important that the protective layer not only be resistant to abrasion, graffiti, and degradation by ultraviolet radiation, it must be non-tacky to prevent blocking during storage of the images, in addition, it must be inexpensive and convenient to apply.

Protective layers that perform very well are known, such as laminated layers of polyethylene terephthalate sheet. However such layers are neither inexpensive nor easy to apply.

Fluoropolymers can provide a surface which is non-sticky and has good resistance to graffiti, because paint does not adhere permanently to it, and which has good resistance to the elements in general. The advantage of fluoropolymer layers is also the major problem with their use as protective layers: nothing sticks to them, but they do not stick to anything. Thus, fluoropolymer layers typically do not adhere to the image they are intended to protect.

Ocampo, U.S. Pat. No. 5,316,608, discloses a protective layer suitable for use with vinyl fabrics. The protective layer comprises a plurality of layers of an acrylic polymer/-fluoropolymer composition, beginning with a layer containing substantially all acrylic followed by layers of increasing fluoropolymer content. This provides a composite layer structure with a top surface having sufficient fluoropolymer content to provide a good weathering surface and an inside surface having sufficient acrylic content to adhere the layer to the receptor. Although this multilayered structure appears successful, it is cumbersome to manufacture and apply. Neumann, U.S. Pat. No. 4,556,89, discloses a composite material composed of a plasticized polyvinyl chloride layer and a protective layer composed of an acrylic polymer, plasticized polyvinyl chloride, and a fluorine-containing copolymer. This protective layer appears to be useful primarily for protection of plasticized polyvinyl chloride layers.

A need exists, therefore, for an inexpensive, clear, transparent, protective layer for ink jet generated images, particularly for large size images, such as posters, panels, banners, displays, and billboards. The protective layer must adhere to the image, be able to withstand weathering and graffiti, have good resistance to abrasion, and not interfere with viewing of the image. Preferably the protective layer should be an integral part of the imaged element so that no additional steps are required for its application.

SUMMARY OF THE INVENTION

The invention is an ink jet receptor element comprising, in order:

a) a temporary carrier layer;

b) a protective layer consisting essentially of a fluoropolymer and an acrylic polymer compatible with said fluoropolymer, wherein said fluoropolymer has a surface energy of about 16 to 30 dynes/cm, and wherein the weight ratio of fluoropolymer to acrylic polymer is about 65:35 to about 85:15; and c) an image transparent, adhesive, ink-receptive layer permanently adhered to the protective layer;

in which, the image transparent, adhesive, ink-receptive layer is receptive to aqueous ink jet inks and comprises a hydrophilic polymer and an adhesive material.

In another embodiment, the invention is a method for forming an ink jet image using this element. In still another embodiment, the invention is an imaged article formed using this element.

This element is especially suited for the preparation of large size images, such as posters, panels, banners, displays, vehicle signage, and billboards. The protective layer adheres to the imaged ink-receptive layer, can withstand weathering and graffiti, has good resistance to abrasion, and not interfere with viewing of the image. The protective layer is also an integral part of the ink jet receptor element so that no additional steps are required for its application.

BRIEF DESCRIPTION OF THE DRAWINGS

The invention can be more fully understood from the following description in connection with the accompanying drawings described as follows.

DETAILED DESCRIPTION OF THE INVENTION

Figure 1:
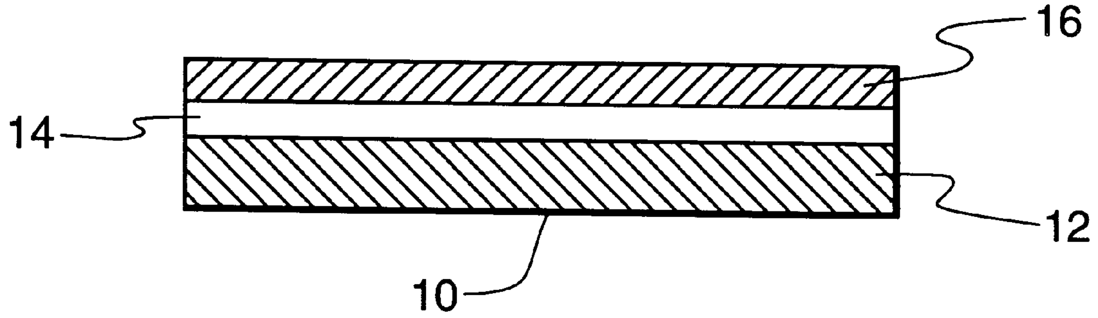
FIG. 1 is a cross-section view of the ink jet receptor element.

The invention is a receptor element for ink jet imaging. The receptor element comprises a temporary carrier layer; an image-transparent protective layer consisting essentially of a fluoropolymer and an acrylic polymer compatible with the fluoropolymer; and an image-transparent, adhesive, ink-receptive layer comprising a hydrophilic polymer and an adhesive material.

In use, an ink jet image is formed on the surface of the ink-receptive layer; the ink-receptive layer is adhered to a substrate; and temporary carrier layer is removed to form an imaged article consisting of the substrate, the ink jet image, the adhesive ink-receptive layer, and the protective layer.

The invention will now be described by reference to the accompanying drawings. Throughout the following description, similar reference characters refer to similar elements in all figures of the drawings.

Ink Jet Receptor Element

Temporary Carrier Layer

Referring to FIG. 1, the temporary carrier layer (12) of the receptor element (10) functions as a temporary support to the superposed layers. It may be any web or sheet material possessing suitable flexibility, dimensional stability and adherence properties to the protective layer (14). Typically, the temporary carrier layer 12 is a flexible polymeric film, such as polyethylene terephthalate film, or a foraminous material such as a paper sheet. The web or sheet may also be surface treated or coated to enhance desired release characteristics, such as treatment with a silicone release agent. Preferred materials for temporary carrier layer 12 are polyethylene terephthalate film and silicone coated, ultraviolet cured paper release liner.

Protective Layer

Referring to FIG. 1, the protective layer (14) is resistant to scratching and abrasion as well as to environmental components and contaminants. It is permanently adhered to ink-receptive layer 16, but is removably adhered to temporary carrier layer 12. Protective layer 14 is transparent in at least one region of the visible spectral region and typically is transparent throughout the visible spectral region.

Protective layer 14 consists essentially of a fluoropolymer and an acrylic polymer. Fluoropolymer refers to a polymer whose structure comprises fluorine atoms covalently bonded to carbon atoms. As is well known to those skilled in the art, such polymers can be prepared by polymerization of fluorinated monomers, such as tetrafluoroethylene, hexafluoropropylene, vinylidene fluoride, perfluorovinyl ethers, and vinyl fluoride, with each other and/or with non-fluorinated monomers, such as ethylene.

Fluoropolymers that may be used in the protective layer are those that can be coated from a homogenous solution and yet have a relatively low surface energy. The fluoropolymer must be sufficiently soluble in a coating solvent that a homogeneous coating solution comprising the fluoropolymer and the acrylic polymer can be formed. The coating solvent must be fugitive, that is, it must have a sufficiently high vapor pressure that it can be removed following coating of the protective layer. Preferred coating solvents are fugitive ketones, such as acetone, methyl ethyl ketone, methyl propyl ketone, methyl butyl ketone, methyl iso-butyl ketone, and cyclohexanone. Small amounts of fugitive co-solvents may be used, provided that the ability of the solvent to form a homogeneous coating solution comprising the fluoropolymer and the acrylic polymer is not adversely affected.

The fluoropolymer should have a surface energy of 16 to 30 dynes/cm. This surface energy is sufficiently low to provide the layer with the desired protective properties. Copolymers of vinylidene fluoride and tetrafluoroethylene may be used. Fluoropolymers having a high content of vinylidene fluoride (i.e., greater than 30% by weight) have good stability in organic solvents. As a result, the application and formation of a coherent protective layer is facilitated without causing damage to the underlying layers of the element. A preferred fluoropolymer is Kynar® SL, a copolymer of vinylidene fluoride and tetrafluoroethylene. Polymers of perfluorovinyl ethers, sold under the tradename of Lumiflon® (ICI Americas, Wilmington, Del.), may also be useful.

In combination with certain concentrations of acrylic polymers, fluoropolymers attain good adhesive quality to the combined adhesive and dielectric layers of the electrographic element without apparent loss of their advantageous protective qualities. The acrylic polymer should be compatible with the fluoropolymer. Useful acrylic polymers include polymers and copolymers of esters of acrylic acid and methacrylic acid, such as methyl acrylate, methyl methacrylate, ethyl acrylate, ethyl methacrylate, propyl acrylate, propyl methacrylate, butyl acrylate, butyl methacrylate, and similar monomers. These materials can be prepared by polymerization techniques well known to those skilled in the art. They are sold under of a variety of tradenames, including Acryloid® (Rohm and Haas) and Elvacite® (Du Pont). A preferred acrylic polymer is Acryloid® A-101, methyl methacrylate acrylic polymer.

A protective layer comprising a mixture of a fluoropolymer and acrylic polymer at weight ratios ranging from about 65:35 to about 85:15, fluoropolymer to acrylic polymer, provides adequate protection from hazards as well as good adhesion. A ratio of about 75:25, fluoropolymer to acrylic polymer, is preferred. The protective layer typically has a dry thickness of about 0.5 to 5 micrometers, preferably about 1.0 to 2.0 micrometers. The protective layer should have a surface energy less than 50 dynes/cm, preferably less than 45 dynes/cm, more preferably less than 40 dynes/cm.

Protective layer 14 may also contain a photostabilizer, to protect the underlying image from damage by ambient ultra-violet light. Photostabilizers are well known in the art and include, for example, 2-hydroxybenzophenones; oxalanilides; aryl esters and the like; and hindered amine light stabilizers, such as bis(2,2,6,6-tetramethyl-4-piperidinyl) sebacate; and combinations thereof. Optical brighteners which may be used to enhance the visual appearance of the imaged layer may be any conventional, compatible optical brightener, e.g., such as optical brighteners marketed by Ciba-Geigy under the trademark of Tinopal®. To prevent distortion of the underlying image when it is viewed through the protective layer, materials that do not absorb strongly in the visible region of the spectrum are preferred.

At times it is desired to provide a range of surface finishes from highly glossy to matte. This may be done by controlling the outermost surface of protective layer 14. This surface replicates the surface of the temporary carrier layer with which it is in contact prior to lamination and separation. If the surface of the temporary carrier layer has a rough texture, or contains any other relief pattern, the image will appear matte. If the surface of the temporary carrier layer is smooth, the image will be glossy.

Alternatively, protective layer 14 may be provided with a matte surface. This matte surface can be obtained by including in the layer particles sufficiently large to give surface irregularities to the layer. Particles of average diameter in the range of about 1 μm to about 15 μm are suitable. This layer typically has a thickness in the range of about 0.5 μm to about 10 μm and preferably in the range of about 1 μm to about 4 μm. A preferred matting agent is amorphous silica.

Ink-Receptive Layer

Referring to FIG. 1, the image transparent, adhesive, ink-receptive layer (16) is permanently adhered to protective layer 14 and provides a dual function of ink receptivity as well as an adhesive to adhere the element to the substrate. Ink-receptive layer 16 comprises a hydrophilic, aqueous-ink sorptive material as well as an adhesive that, when activated, functions to adhere the imaged element to the substrate. The ink-receptive layer may be a blend of the necessary materials in a single layer, or it may be a composite of two or more individual layers in which one layer contains the major character of the ink receptive material and the other contains the major character of an adhesive material and impart a shared character to the ink-receptive layer.

The ink-receptive layer is visually transparent in at least one region within the visible spectral region and typically is transparent throughout the visible spectral region. The absorption of the ink-receptive layer can be matched to that of the protective layer.

Ink-receptive layer 16 may be prepared from a wide variety of hydrophilic, aqueous ink sorptive materials. The ink-receptive layer is typically formulated for a particular ink jet device and the related ink used therein. The ink-receptive layer must also have adhesive characteristics. Suitable formulations for the ink-receptive material are disclosed in Burwasser, U.S. Pat. Nos. 4,74,850, and 4,528,242; Desjarlais, U.S. Pat. No. 4,775,594; Light, U.S. Pat. No. 5,126,195; Kruse, U.S. Pat. No. 5,193,306; and Cahill, PCT Application PCT/US94/09644 (Publication WO 95/06564), corresponding to U.S. application Ser. Nos. 08/115,561, and 08/115,564, all of which are incorporated herein by reference.

Ink-receptive layer 16 typically is comprised of at least one hydrophilic polymer or resin, which also may be water soluble. Suitable hydrophilic polymers include, for example: substituted polyurethanes, polyvinyl alcohol and substituted polyvinyl alcohols; polyvinyl pyrrolidone and substituted polyvinyl pyrrolidones; vinyl pyrrolidone/vinyl acetate copolymer; vinyl acetate/acrylic copolymers; acrylic acid polymers and copolymers; acrylamide polymers and copolymers; cellulosic polymers and copolymers; styrene copolymers of allyl alcohol, acrylic acid, malaeic acid, esters or anhydride, and the like; alkylene oxide polymers and copolymers; gelatins and modified gelatins; and polysaccharides.

Preferred hydrophilic polymers include: polyvinyl pyrrolidone and substituted polyvinyl pyrrolidones; polyvinyl alcohol and substituted polyvinyl alcohols; vinyl pyrrolidone/-vinyl acetate copolymer; vinyl acetate/acrylic copolymer; polyacrylic acid; polyacrylamides; hydroxyethylcellulose; carboxyethylcellulose; gelatin; and polysaccharides. A more preferred hydrophilic polymer is polyvinyl pyrrolidone.

The ink-receptive layer may also contain other water insoluble or hydrophobic polymers or resins to impart a suitable degree of hydrophilicity and/or other desirable physical and chemical characteristics. Suitable hydrophobic polymers include polymers and copolymers of styrene, acrylics, urethanes, and the like. Preferred polymers and resins include styrenated acrylic copolymers; styrene/allyl alcohol copolymers; nitrocellulose; carboxylated resins; polyester resins; polyurethane resins; polyketone resins; polyvinyl butyral; and mixtures thereof.

The adhesive material functions to permanently adhere the imaged element to the substrate. The adhesive material may be chosen from a variety of conventional adhesive materials, e.g., such as thermally activated, pressure sensitive, photo-activated, or contact adhesives, provided it is compatible with the components of the ink-receptive layer and that it contributes, at least in part, to ink receptivity. The term "compatible" is intended to mean that the adhesive material may be dispersed within the ink-receptive layer without substantially altering the image transparency or ink receptivity of the layer.

Typically, the adhesive material is a thermally activated, hydrophilic, adhesive material comprised of thermoplastic polyurethanes; polycaprolactone; acrylic copolymers; and combinations thereof. Representative thermally activated adhesive materials include Rovace® HP-2931 vinyl acetate/-acrylic copolymer (Rohm & Haas); Morthane® CA-116 urethane resin (Morton International); Tone® Polymer P767E biodegradable plastic resin (Union Carbide); Elvax® 240 vinyl resin (DuPont); and the like. When the adhesive material is blended into the ink receptive material to form a single layer, preferred adhesive materials are polyurethanes. In the instance when the adhesive material is coated as a separate layer onto the ink-receptive layer, preferred adhesive materials are polycaprolactones. When the adhesive material is coated as a separate layer, the layer typically has a thickness in the range of about 0.5 μm to about 10 μm.

The ink-receptive layer also may contain other added components, such as dye mordants, surfactants, particulate materials, colorants, ultraviolet absorbing materials, organic acids, and optical brighteners. Dye mordants that may be used to fix the ink to the ink-receptive layer may be any conventional dye mordant. e.g. such as polymeric quaternary ammonium salts, polyvinyl pyrrolidone, and the like. Surfactants, used as coating aids for the ink-receptive layer, may be any nonionic, anionic, or cationic surfactant. Particularly useful, are fluorosurfactants, alkylphenoxypolyglycidols, and the like. Colorants, e.g., dyes and/or pigments, may added provided the layer remains visually transparent in at least one region of the visible spectral region.

Particulate material is believed to enhance the smoothness of the ink-receptive surface, particularly after it has been printed, without adversely affecting the transparent characteristics of the element. Suitable particulate material includes inorganic particles such as silicas, chalk, calcium carbonate, magnesium carbonate, kaolin, calcined clay, pyrophylite, bentonite, zeolite, talc, synthetic aluminum and calcium silicates, diatomatious earth, anhydrous silicic acid powder, aluminum hydroxide, barite, barium sulfate, gypsum, calcium sulfate, and the like; and organic particles such as polymeric beads including beads of polymethylmethacrylate, copoly(methylmethacrylate/divinylbenzene), polystyrene, copoly(vinyltoluene/t-butylstyrene/methacrylic acid), polyethylene, and the like. The composition and particle size of the particles are selected so as not to impair the transparent nature of the ink-receptive layer.

Organic acids, used to adjust the pH and hydrophilicity in the ink-receptive layer, typically are non-volatile organic acids such as alkoxy acetic acids, glycolic acid, a dibasic carboxylic acids and half esters thereof, tribasic carboxylic acids and partial esters thereof, aromatic sulfonic acids, and mixtures thereof. Preferred organic acids include glycolic acid, methoxy acetic acid, citric acid, malonic acid, tartaric acid, malic acid, maleic acid, fumaric acid, itaconic acid, succinic acid, oxalic acid, 5-sulfo-salicylic acid, p-toluene-sulphonic acid, and mixtures thereof.

Substrate

Figure 2:
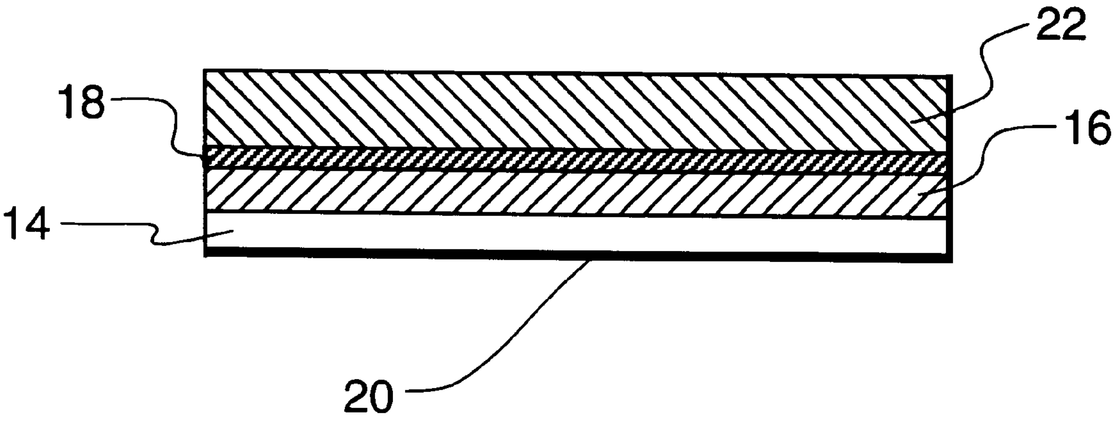
FIG. 2 is a cross-section view of a protected ink jet image adhered to a substrate.

Referring to FIG. 2, the imaged element (20) comprises the protective layer (14), the adhesive, ink-receptive layer (16), and the ink jet image (18) adhered to the substrate (22).

Substrate 22 functions as the final support for ink jet image 18. It may be any surface upon which an image is desired. Typically, it is a web or sheet material possessing dimensional stability and adherence properties through the adhesive of ink-receptive layer 16 to ink jet image 18.

The web or sheet material may be a flexible polymeric film, such as polyethylene terephthalate film; a foraminous material, such as a paper sheet, or cloth; metal films or webs, such as aluminum, steel, or tin-plate; or any composites or laminates thereof. It also be a rigid or semi-rigid sheeting or plate, such as sheeting or plates of metal, glass, ceramic, plastic, cardboard, or any composites or laminates thereof. It may vary in size from that of a photographic print, e.g., having an area of about 30 $cm^2$ or less, to that of vehicle signage or billboards, e.g., having an area of about 70 $m^2$ or greater. Because the protective layer and ink-receptive layer are highly compliant, the substrate also may vary in shape and surface topography, e.g., spherical, embossed, etc.

When a transparency is to be produced, the substrate is transparent. It may contain components which strongly absorb ultraviolet radiation, such as those described above. It may be surface treated or coated with a material to enhance desired surface characteristics, e.g. sub-coatings, electric discharge treatment, and the like. By careful selection of the adhesive, the imaged ink-receptor element can be applied to most solids or foraminous materials, e.g., adhesive backed vinyl, cling vinyl, and polyethylene terephthlate films; steel, glass, ceramic, and wood sheets and objects.

Substrate 22 may further comprise an adhesive layer adhered to the surface of the substrate opposite of that to which the image is adhered, e.g., the back side, for mounting the imaged article to a permanent support, such as a wall or a billboard. The adhesive material of the adhesive layer may be any contact, thermal or pressure sensitive adhesive, such as described above, and may be an integral part of substrate 22 or it may be applied just prior to a mounting step.

Typically, a removable cover sheet is temporarily adhered to the adhesive surface of the substrate to protect against damage during storage or preliminary handling. The removable cover sheet may be any conventional release cover sheet.

Formation of a Protected Image

Imaging

Figure 3:
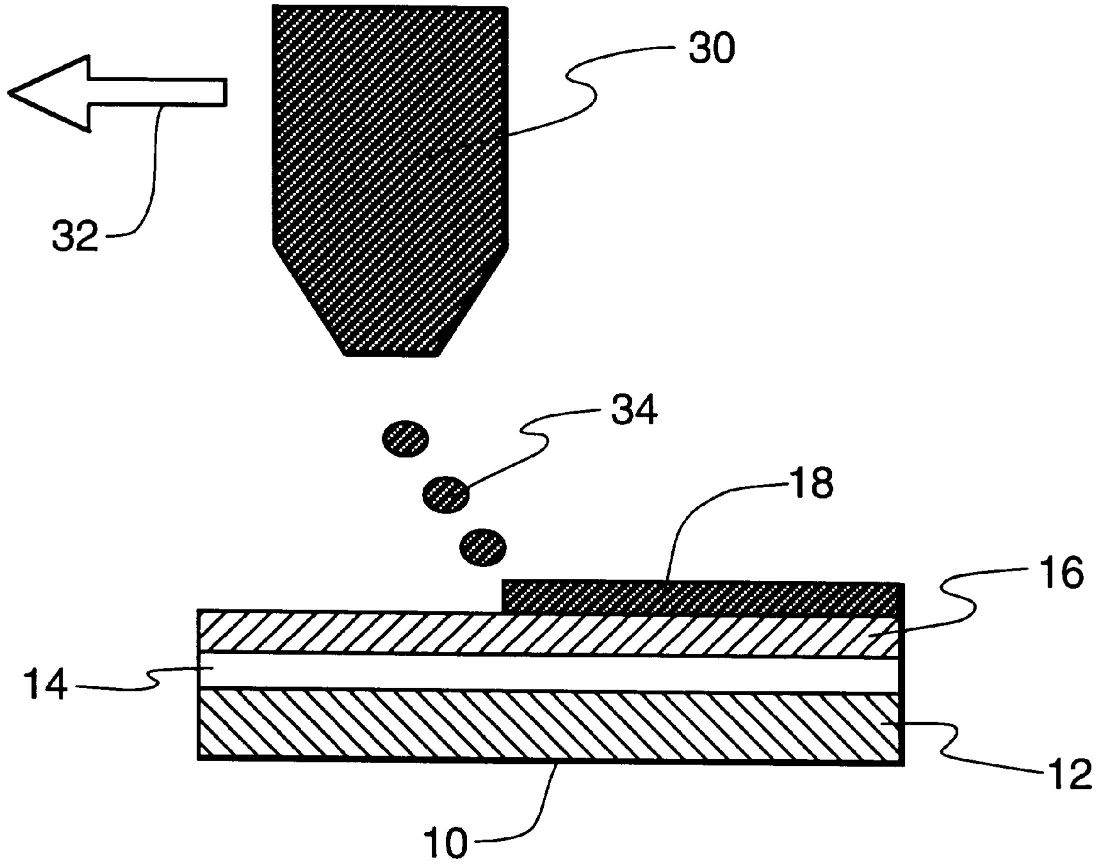
FIG. 3 is a cross-sectional view showing formation of an ink jet image on the ink jet receptor element.

In the first step one or more ink jet images is deposited on ink-receptor element 10. Referring to FIG. 3, ink jet device 30 traversing in direction 32 across ink receptor element 10, imagewise deposits ink droplets 34 on adhesive, ink-receptive layer 16 to form ink jet image 18 on receptor element 10. The imaged receptor element comprises: temporary carrier layer 12, image transparent, protective layer 14, image transparent, adhesive, ink-receptive layer 16, and ink jet image 18.

The ink jet device used to print ink jet image 18 may be any conventional ink jet printer used to print a single color or a full color image. Conventional ink jet printing methods and devices are disclosed, for example, in W. E. Haas, "Non-Impact Printing Technologies": Chapter 13, pp. 379–384, of *Imaging Processes and Materials—Neblette's Eighth Edition*, John Sturge, Vivian Walworth & Allan Shepp, eds., Van Nostrand Reinhold, New York, 1989. Additional ink jet devices include, for example, Hewlett Packard Desk Jet 500 and 500C printers; Lexmark® ink jet printers; Cannon Bubblejet® printers; NCAD Computer Corporation Novajet® printers; and the Encad Novajet Pro printer. Image 18 can be either a one-color ink image, typically black, or a multicolor image, typically a four-color subtractive color image consisting of yellow, magenta, cyan and black images in register. Unless the ink jet image is to be used in the manufacture of a transparency, the image typically is printed on the adhesive, ink-receptive layer as a reverse or mirror image so that the image will have correct orientation when applied to an opaque substrate.

The inks used in the ink imaging process are well known to those skilled in the art. The ink compositions typically are liquid compositions comprising a solvent or carrier liquid, dyes or pigments, humectant, organic solvents, detergents, thickeners, preservatives, and the like. The solvent or carrier liquid typically is water, although ink in which organic materials, such as polyhydric alcohols, as the predominant solvent or carrier also are used. The dyes used in such compositions are typically water-soluble direct or acid type dyes.

Lamination

Figure 4A:
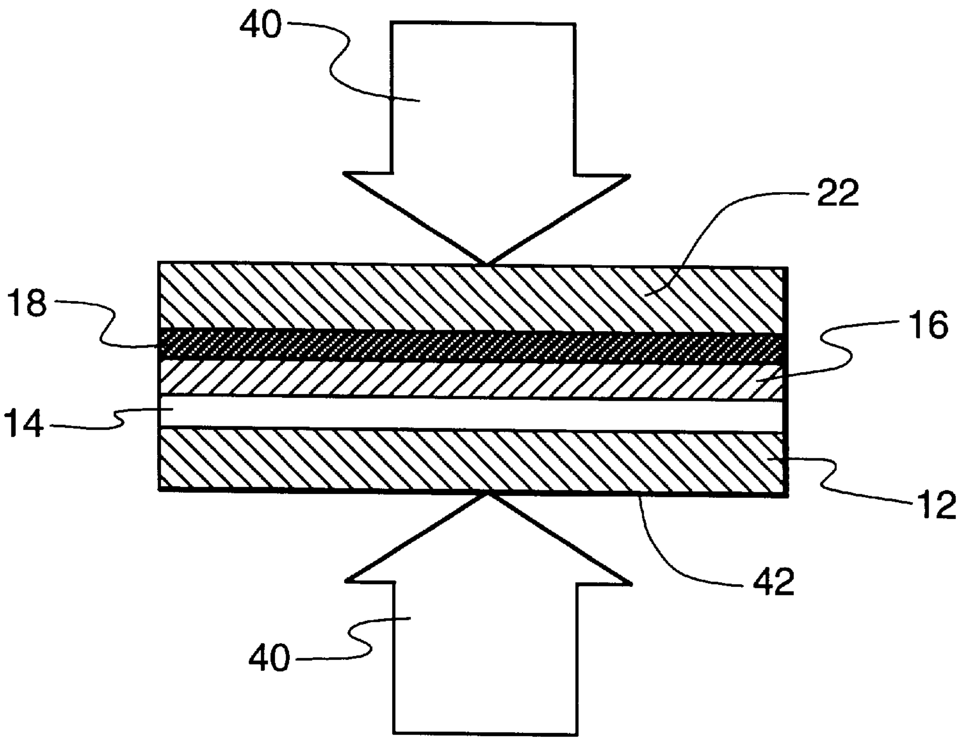
FIG. 4*a* is a cross-sectional view showing lamination of a substrate to an imaged ink jet receptor element.

The second step comprises applying the ink jet image of the imaged receptor element to the surface of the substrate. Referring to FIG. 4*a*, the substrate (22) is contacted and adhered (typically permanently) to the ink jet image (18) using an applied pressure (40) to the surfaces of the temporary carrier layer (12) and the substrate (22) to activate the adhesive and form an imaged laminate (42). When only a pressure sensitive adhesive is used, the applied pressure must be sufficient to activate the adhesive to form a permanent bond between the layers. The substrate typically is applied to the ink jet image under an applied pressure of about 0.07 $kg/cm^2$ (1 p.s.i.) to about 7 $kg/cm^2$ (100 p.s.i.) or greater. "Applied pressure" means the absolute pressure applied to a unit area of the surface as conventionally derived from the geometry of the pressure means, e.g., the geometry of the laminating nip, in combination with a measurement means, e.g., a calibrated gauge pressure.

Suitable means to apply pressure include platen presses; counterpoised, double roll, laminating devices; vacuum laminating devices; scanning, single roll, laminating devices; hand-held, rollers and squeegees; etc. Roll laminating devices are typically preferred because they readily minimize air entrapment between the substrate and the ink jet image during the application process step. Vacuum may be applied with such devices to further eliminate air entrapment.

Typically, the adhesive is a thermally activated adhesive. Heat is typically applied to the imaged receptor element prior to and/or concurrently with the application of the applied pressure. Although the temperature used to activate the adhesive depends on the nature of the material, the substrate is applied to the ink jet image at a temperature of about 80° C. or greater and preferably about 100° C. or greater. Typical application temperatures range from about 220° F. (104° C.) to about 310° F. (155° C.). Typically, temperature is measured on the surface of the heated roll or platen by means of temperature sensitive tape. The imaged receptor element may be heated by radiant or contact heaters prior to its application and then applied to the substrate while hot. Alternatively the pressure means may also function as a heater, e.g., such as a hot roll laminator, or both prior and concurrent heating may be used.

If the adhesive may also be a photo-activated adhesive, it is typically irradiated with actinic radiation either concurrent with, or subsequent to, the application of the applied pressure. The substrate, the protective layer, and any other intervening layer or layers should be transparent to the actinic radiation that activates the photo-adhesive. When the adhesive is photo-activated, the applied pressure may be just sufficient to bring the surface of the substrate into intimate contact with the surface of the ink jet image.

Removal of the Temporary Carrier Layer

Figure 4B:
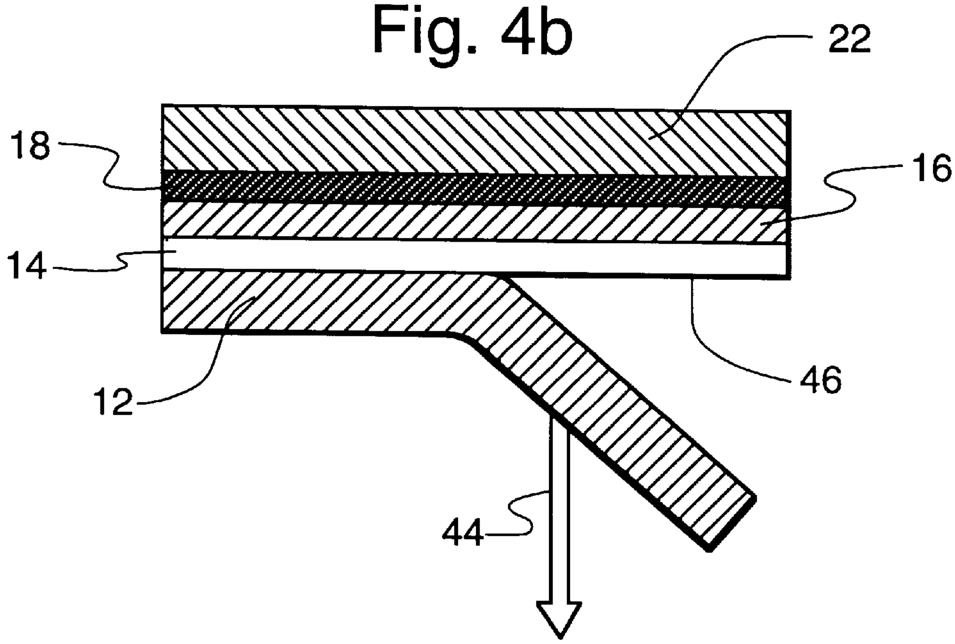
FIG. 4*b* is a cross-sectional view showing removal the temporary carrier layer from the imaged laminate.

The third step comprises removing temporary carrier layer 12 from imaged laminate 42 to form the imaged article. Referring to FIG. 4*b*, the temporary carrier layer is removed, using removal force 44, from the surface of the protective layer to form the imaged article (46). Typically, the temporary carrier layer is removed with a removal force directed at an angle of 90° or more from the surface of the protective layer. The removal rate and the removal force are not critical; the preferred values will depend on the materials used to form the element.

The temperature at which the temporary carrier layer is removed also depends on the materials used to form the element. The temporary carrier layer may be removed at room temperature or, alternatively, the imaged laminate may be heated to facilitate removal. When a thermally activated adhesive material is used to form the imaged laminate, it surprisingly has been found that the temporary carrier layer can be removed immediately after formation of the imaged laminate (i.e., while still in a heated state from the application process step) without delamination of the ink jet image or any of the other component layers. In this context, "immediately" means about 1 minute or less and preferably between about 1 second and about 20 seconds. Alternatively, when a thermally activated adhesive material is used to form the imaged laminate, the laminate may be cooled and stored before removal of the temporary carrier layer. In this instance, the temporary carrier layer can be removed at room temperature from the imaged laminate without delamination of the ink jet image or any of the other component layers.

Alternatively, imaged laminate 46 may be reheated prior to removal of temporary carrier layer 12. Laminate 46 typically is reheated to a temperature that is about ±5° C. of the temperature used to form the element. To further protect the image from damage before its use, the temporary carrier layer may left in place during storage and handling, and removed just prior to use.

If the substrate further comprises an adhesive layer, and optionally, a removable cover sheet temporarily adhered to the adhesive layer, the process further comprises, the additional step of removing the removable cover sheet, if present, adhering the adhesive layer to a permanent support mount the imaged article. This step may be carried out either before or after removal of the temporary carrier layer. This is particularly useful for preparing component protected image "tiles" and then mounting each tile to form a composite display image such as on a billboard or the like. Depending on the end use, the mounting adhesive may be either permanent or temporary.

Industrial Applicability

The ink jet image receptor element can be used to prepare imaged articles having the fluoropolymer/acrylic polymer protective layer. The protective layer is quite impervious to outdoor environmental damage, such as surface pitting, accumulation of dirt and stains, general degradation, and offsetting, thus allowing the imaged article to function quite effectively on posters, billboards, banners, displays, vehicle signage, and similar applications.

The protective layer can withstand certain graffiti cleaning products without a resulting destruction to the underlying image. Graffiti can be removed from the protective layer with non-toxic citrus cleaners, such as Graffiti Buster® (BioChem Systems, Golden, Colo.). iso-Propyl alcohol also works well in most instances. Cleaners containing strong organic solvents, such as acetone, toluene, or chlorinated solvents, as well as cleaners containing primarily petroleum distillates should not be used. They eat into the protective layer and destroy the underlying image.

The imaged article is also quite invulnerable to blocking or sticking together, such as may occur in standard office conditions or in the trunk of an automobile.

The advantageous properties of this invention can be observed by reference to the following examples which illustrate, but do not limit, the invention.

EXAMPLES

Glossary

Acryloid® A-101 40% solids methyl methacrylate acrylic polymer in methyl ethyl ketone (Tg=105° C.) (Rohm and Haas, Philadelphia, Pa.)

Kynar® SL Copolymer of vinylidene fluoride and tetrafluoroethylene (mp 122–126° C.) (Elf Atochem, King of Prussia, Pa.)

NeoRez® R-9679 Aliphatic aqueous colloidal dispersion of a urethane polymer containing 37% by weight solids (specific gravity of solids is 1.16 and acid number of resin solids is 17.0) (Zeneca Resins, Wilmington, Mass.)

PVP K-90 Poly(vinylpyrrolidone), viscosity average molecular weight of 700,000 (GAF Chemicals, Wayne, N.J.)

Zonyl® FSN Nonionic fluorosurfactant (E.I. du Pont de Nemours & Co., Wilmington, Del.)

Example 1

This example illustrates the preparation of images with both pigmented and dye-based inks and transfer of the image both to a flexible and to a rigid substrate.

Coating Solutions

The protective layer coating solution was prepared from the following ingredients:

| Ingredient | Weight (g) |
|---|---|
| Acetone | 86.25 |
| Kynar ® SL | 7.50 |
| Acryloid ® A-101 | 6.25 |

The acetone was added to a stainless steel mix tank. Acryloid® A-101 was added and stirred in with a Lightn'in® Mixer for 5 min. Kynar® SL was added and the mixture stirred for an additional 5 min.

The image receiving layer coating solution was prepared from the following ingredients:

| Ingredient | Weight (g) |
|---|---|
| Deionized water | 28.29 |
| Ethanol | 16.00 |
| PVP K-90 | 6.44 |
| Neorez ® R-9630 | 48.46 |
| Zonyl ® FSN | 0.40 |

PVP K-90 was slowly dissolved in the mixture of water and ethanol with a Lightn'in® Mixer. After the PVP was in solution, the other ingredients were added and stirring continued for an additional 15 min.

Coating

The protective layer coating solution was applied to the release coated surface of the temporary carrier layer of Melinex® 059 polyethylene terephthalate film (ICI Americas) with a #10 Mayer rod. The resulting element was dried in an oven at about 121° C. (250° F.) for 2 min to give an element consisting of temporary carrier layer 12 and protective layer 14. Protective layer 14 had a dry coat weight of about 0.30 lbs/tsf and was about 0.10 mils (about 2.5 microns) thick.

The ink-receptive layer coating solution was applied to the dried protective layer with a #130 Mayer rod. The coating was dried in an oven at about 121° C. (250° F.) for 8 min to give an ink receptor element (10) consisting of temporary carrier layer 12, protective layer 14, and ink-receptive layer 16. The ink-receptive layer had a dry coat weight of about 8.0 to 9.0 lbs/tsf and was about 2.0 mils (about 51 microns) thick.

Imaging

Two ink-receptor elements 10 were imaged with an Encad Novajet Pro ink jet printer with Graphic Outdoor (GO) 4-color pigmented inks using a full color test pattern. Two elements were imaged with a Hewlett Packard 755 ink jet printer using pigmented black ink and yellow, magenta, and cyan dye-based inks and the same full color test pattern.

Lamination and Removal of the Temporary Carrier Layer

The imaged elements were laminated to the substrate (22) with a Protech Falcon laminator. One Encad imaged element and one Hewlett Packard imaged element were each laminated to Saturn premium scrim vinyl, a flexible substrate, at about 121° C. (250° F.) at about 1 cm/sec (2 ft/min). One Encad imaged element and one Hewlett Packard imaged element were each laminated to Ami-sign board, a rigid substrate, at about 149° C. (300° F.) at about 0.5 cm/sec (1 ft/min). After lamination, the imaged laminates (42) were allowed to cool for at least 5 min. The temporary carrier layer was removed by lifting the edge and gently pulling.

Image Evaluation

The resulting imaged articles (46) were evaluated as described below. If no protective layer was left on the release liner, the transfer was rated as good. Adhesion was evaluated by tape pull procedure with 810 Scotch® Brand Tape. Print quality was determined by a visual examination of the image. Results are shown in Table 1.

TABLE 1

| Sample | Transfer | Print Quality | Adhesion[a] |
|---|---|---|---|
| HP 755/ Saturn Vinyl | Good | Good | Good |
| HP 755/ Ami-Sign | Good | Good | Good |
| Encad GO Inks/ Saturn Vinyl | Good | Moderate/Good | Moderate/Good |
| Encad GO Inks/ Ami-Sign | Good | Moderate/Good | Good |

[a]180° tape pull.

Having described the invention, we now claim the following and their equivalents.

What is claimed is:

1. An ink jet receptor element comprising, in order:

(a) a temporary carrier layer;

(b) a protective layer consisting essentially of a fluoropolymer and an acrylic polymer compatible with the fluoropolymer, wherein the fluoropolymer has a surface energy of about 16 to 30 dynes/cm, and wherein the weight ratio of fluoropolymer to acrylic polymer is about 65:35 to about 85:15; and (c) an image transparent, adhesive, ink-receptive layer permanently adhered to the protective layer, the image transparent, adhesive, ink-receptive layer being receptive to aqueous ink jet inks and comprising a hydrophilic polymer and an adhesive material.

2. The element of claim 1 in which the fluoropolymer is a polymer of one or more monomers selected from the group consisting of tetrafluoroethylene, hexafluoropropylene, vinylidene fluoride, perfluorovinyl ethers, and vinyl fluoride.

3. The element of claim 1 in which the acrylic polymer is a polymer of one or more monomers selected the group consisting of methyl acrylate, methyl methacrylate, ethyl acrylate, ethyl methacrylate, propyl acrylate, propyl methacrylate, butyl acrylate, and butyl methacrylate.

4. The element of claim 1 in which the hydrophilic polymer is selected from the group consisting of substituted polyurethanes, polyvinyl pyrrolidone, substituted polyvinyl pyrrolidones, polyvinyl alcohol, substituted polyvinyl alcohols, vinyl pyrrolidone/vinyl acetate copolymers, vinyl acetate/acrylic copolymers, polyacrylic acid, polyacrylamides, hydroxyethylcellulose, carboxyethylcellulose, gelatin, and polysaccharides.

5. The element of claim 1 in which the adhesive material is a thermally activated adhesive material.

6. The element of claim 5 in which the adhesive material is selected from the group consisting of thermoplastic polyurethanes, polycaprolactone, acrylic copolymers, and combinations thereof.

7. The element of claim 1 additionally comprising an ink jet image on the ink-receptive layer.

8. The element of claim 7 additionally comprising a substrate on the ink jet image.

9. The element of claim 1 in which the fluoropolymer is a copolymer of vinylidene fluoride and tetrafluoroethylene.

10. The element of claim 1 in which the hydrophilic polymer is polyvinyl pyrrolidone and the adhesive material is a polyurethane.

11. The element of claim 10 in which the fluoropolymer is a copolymer of vinylidene fluoride and tetrafluoroethylene.

12. The element of claim 1 in which the hydrophilic polymer is polyvinyl pyrrolidone, the adhesive material is a polyurethane, the fluoropolymer is a copolymer of vinylidene fluoride and tetrafluoroethylene, and the protective layer has a thickness of about 0.5 to 5 micrometers.

13. The element of claim 12 additionally comprising an ink jet image on the ink-receptive layer.

14. An imaged article comprising, in order:

(a) a protective layer consisting essentially of a fluoropolymer and an acrylic polymer compatible with the fluoropolymer, wherein the fluoropolymer has a surface energy of about 16 to 30 dynes/cm, and wherein the weight ratio of fluoropolymer to acrylic polymer is about 65:35 to about 85:15;

(b) an image transparent, adhesive, ink-receptive layer permanently adhered to the protective layer, the image transparent, adhesive, ink-receptive layer being receptive to aqueous ink jet inks and comprising a hydrophilic polymer and an adhesive material;

(c) an ink jet image; and (d) a substrate.

15. The imaged article of claim 14 additionally comprising, in order, (e) an adhesive layer adhered to the substrate; and (f) a permanent support.

16. The imaged article of claim 14 in which the fluoropolymer is a copolymer of vinylidene fluoride and tetrafluoroethylene.

17. The imaged article claim 16 in which the hydrophilic polymer is polyvinyl pyrrolidone and the adhesive material is a polyurethane.

18. A method for forming an ink jet image, the method comprising, in order:

a) forming an ink jet image on an ink jet imaging element comprising, in order:

1) a temporary carrier layer;

2) a protective layer consisting essentially of a fluoropolymer and an acrylic polymer compatible with the fluoropolymer, wherein the fluoropolymer has a surface energy of about 16 to 30 dynes/cm, and wherein the weight ratio of fluoropolymer to acrylic polymer is about 65:35 to about 85:15; and 3) an image transparent, adhesive, ink-receptive layer permanently adhered to the protective layer, in which the image transparent, adhesive, ink-receptive layer is receptive to aqueous ink jet inks and comprises a hydrophilic polymer and an adhesive material, to form an element comprising, in order, the ink jet image, the image transparent, adhesive, ink-receptive layer, the protective layer, and the temporary carrier layer;

b) laminating the element formed in step a) to a substrate to form an element comprising, in order: the substrate; the ink jet image; the image transparent, adhesive, ink-receptive layer; the protective layer; and the temporary carrier layer; and c) removing the temporary carrier layer from the element formed in step b) to form an element comprising, in order: the substrate; the ink jet image; the image transparent, adhesive, ink-receptive layer; and the protective layer.

19. The method of claim 18 in which step b) is carried out at a temperature of about 80° C. or greater.

20. The method of claim 16 in which the fluoropolymer is a copolymer of vinylidene fluoride and tetrafluoroethylene.

* * * * *